United States Patent
Vigild et al.

(10) Patent No.: US 8,036,812 B2
(45) Date of Patent: Oct. 11, 2011

(54) METHOD FOR CONTROLLING AN INTERNAL COMBUSTION ENGINE

(75) Inventors: Christian Winge Vigild, Aldenhoven (DE); Daniel Roettger, Eynatten (BE); David Joseph Dronzkowski, Sterling Heights, MI (US); Eric Kurtz, Dearborn, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 12/849,161

(22) Filed: Aug. 3, 2010

(65) Prior Publication Data

US 2011/0035133 A1 Feb. 10, 2011

(30) Foreign Application Priority Data

Aug. 6, 2009 (DE) .................. 10 2009 028 307

(51) Int. Cl.
*F02D 41/30* (2006.01)
*F02B 3/00* (2006.01)
*F02M 51/00* (2006.01)

(52) U.S. Cl. .................. 701/103; 701/108; 123/673

(58) Field of Classification Search .......... 701/103–105, 701/108–109; 123/480, 672–674, 568.21, 123/679, 687; 60/274, 276, 285
See application file for complete search history.

(56) References Cited

U.S. PATENT DOCUMENTS

| | | | |
|---|---|---|---|
| 7,163,007 B2 * | 1/2007 | Sasaki et al. | 123/673 |
| 7,261,098 B2 | 8/2007 | Vigild et al. | |
| 7,400,967 B2 * | 7/2008 | Ueno et al. | 701/104 |

FOREIGN PATENT DOCUMENTS

EP 1705354 B1 9/2006

* cited by examiner

*Primary Examiner* — Hieu T Vo
(74) *Attorney, Agent, or Firm* — Julia Voutyras; Brooks Kushman P.C.

(57) ABSTRACT

A system and method are disclosed for controlling an internal combustion engine in which actual concentration of combusted gas in the intake is compared with desired concentration of combusted gas in the intake. When a difference is detected, at least one of start of injection timing and quantity of fuel injected is adjusted in accordance with the difference. The actual concentration of combusted gas in the intake is estimated based on engine sensors such as an oxygen sensor coupled to an engine intake. The adjustment of injection timing and/or quantity of fuel is performed, according to some embodiments, during a transition between a low temperature combustion mode and a standard diesel combustion mode.

20 Claims, 3 Drawing Sheets

METHOD FOR CONTROLLING AN INTERNAL COMBUSTION ENGINE

CROSS-REFERENCE TO RELATED APPLICATIONS

This application claims foreign priority benefits under 35 U.S.C. §119(a)-(d) to DE 10 2009 028307.2 filed Aug. 6, 2009, which is hereby incorporated by reference it its entirety.

BACKGROUND

1. Technical Field

The present invention relates to a system and method for controlling an internal combustion engine.

2. Background Art

Faced with stricter emissions standards, new and increasingly sensitive combustion modes, e.g. low temperature combustion (LTC), have been developed to reduce the exhaust emissions of internal combustion engines. However, these combustion modes tend to be less robust than standard diesel combustion modes in regards to errors or deviations between the desired and actual composition of the intake gas. Such deviations are difficult to overcome during transient operating phases in which EGR (exhaust gas recirculation) rate and/or the intake pressure are commanded to change rapidly to accomplish the transition.

When actual FMAN (proportion of combusted gas in the intake on a mass basis) is less than desired FMAN, NOx emissions and combustion noise tend to be higher. When actual FMAN exceeds desired FMAN, combustion may become unstable, which can lead to loss of torque, increased fuel consumption, and increase emission of CO and unburned hydrocarbons.

SUMMARY

To overcome at least one problem, a system and method to control a diesel engine is disclosed in which a desired proportion of combusted gas in an engine intake, an actual proportion of combusted gas in the engine intake, and an injection timing based at least on the difference between the desired and actual proportion of combusted gas are determined. In some embodiments, the quantity of fuel to inject into engine cylinders is also determined based on the difference between the desired and actual proportion of combusted gas. The determined quantity of fuel is commanded to a fuel injector coupled to a cylinder of the engine. The determined injection timing is commanded to the fuel injector. In some embodiments, such control is performed during transitions between low temperature combustion and standard diesel combustion. In yet other embodiments, at least one pilot injection is provided during the transition.

The quantity of fuel injected and the injection timing are further based on a present engine operating condition. The adjustments to SOI, fuel quantity, and addition of a pilot injection can be accomplished during a transition between combustion modes. However, according to embodiments of the disclosure, SOI, fuel quantity, and/or pilot injection are adjusted for transitions among operating conditions within a combustion mode.

The actual composition of intake gas is based on a signal from an oxygen sensor coupled to the engine intake. Alternatively, actual composition of intake gas is based on signals from engine intake pressure, intake temperature, intake mass flow, engine speed, oxygen concentration in the exhaust, and engine speed.

A system to control an engine is disclosed including an electronic control unit (ECU), an engine cylinder having a fuel injector electronically coupled to the ECU, and an engine sensor electronically coupled to the ECU. An actual intake gas composition is estimated based on a signal from the engine sensor. The ECU commands at least one of an adjustment in quantity of fuel and fuel injection timing when the actual intake gas composition differs from a desired intake gas composition. In one embodiment, the engine sensor is an oxygen sensor coupled to an engine intake. The ECU determines whether to transition between a low temperature combustion mode and a standard diesel combustion mode and the at least one of an adjustment in quantity of fuel and fuel injection timing is commanded by the ECU during the transition. The system includes an exhaust gas recirculation (EGR) system having: an EGR duct coupling a engine intake with an engine exhaust and an EGR valve disposed in the EGR duct, and an oxygen sensor coupled to the engine intake at a location downstream of where the EGR duct is coupled to the engine intake. The ECU is electronically coupled to the EGR valve, and the ECU estimates the actual intake gas composition based on at least one of mass air flow into the engine, intake manifold absolute pressure, temperature of the intake gases downstream of the addition of EGR into the intake gases, engine rpm, and a signal from an oxygen sensor coupled to an engine exhaust.

According to some embodiments, the proportion of exhaust gas in an engine intake is denoted by FMAN. LTC and standard diesel combustion employ excess oxygen, i.e., lean mixtures, such that the exhaust gases contain a significant proportion of oxygen. EGR rate is a measure of a fraction of the mixture entering the engine recirculated from the exhaust. FMAN is corrected for the proportion of the exhaust gas that contains oxygen. Thus, FMAN is the fraction of combusted gases in the intake mixture. Herein, exhaust gases refers to the total exhaust gas and combusted gases refer to the exhaust gas less the oxygen. In one alternative, FMAN is used as a shorthand notation for composition of the intake gas. The injection timing can be denoted as start of injection (SOI).

An advantage per the disclosure is that it facilitates operating in LTC mode, a combustion mode that provides particularly high fuel efficiency. Because combustion mode is caused to transition between LTC and standard diesel combustion modes to provide a desired torque response, the ability to smoothly make transitions facilitates using LTC. According to embodiments of the disclosure, torque drops during the transition are avoided. Furthermore, the emissions and noise are held in check according to embodiments of the disclosure. Thus, the high fuel efficiency of LTC is accessible without incurring customer complaints due to poor torque performance, emission noncompliance, and/or high noise levels at sensitive operating conditions, such as during a transition between LTC and standard diesel combustion.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations.

Figure 1:
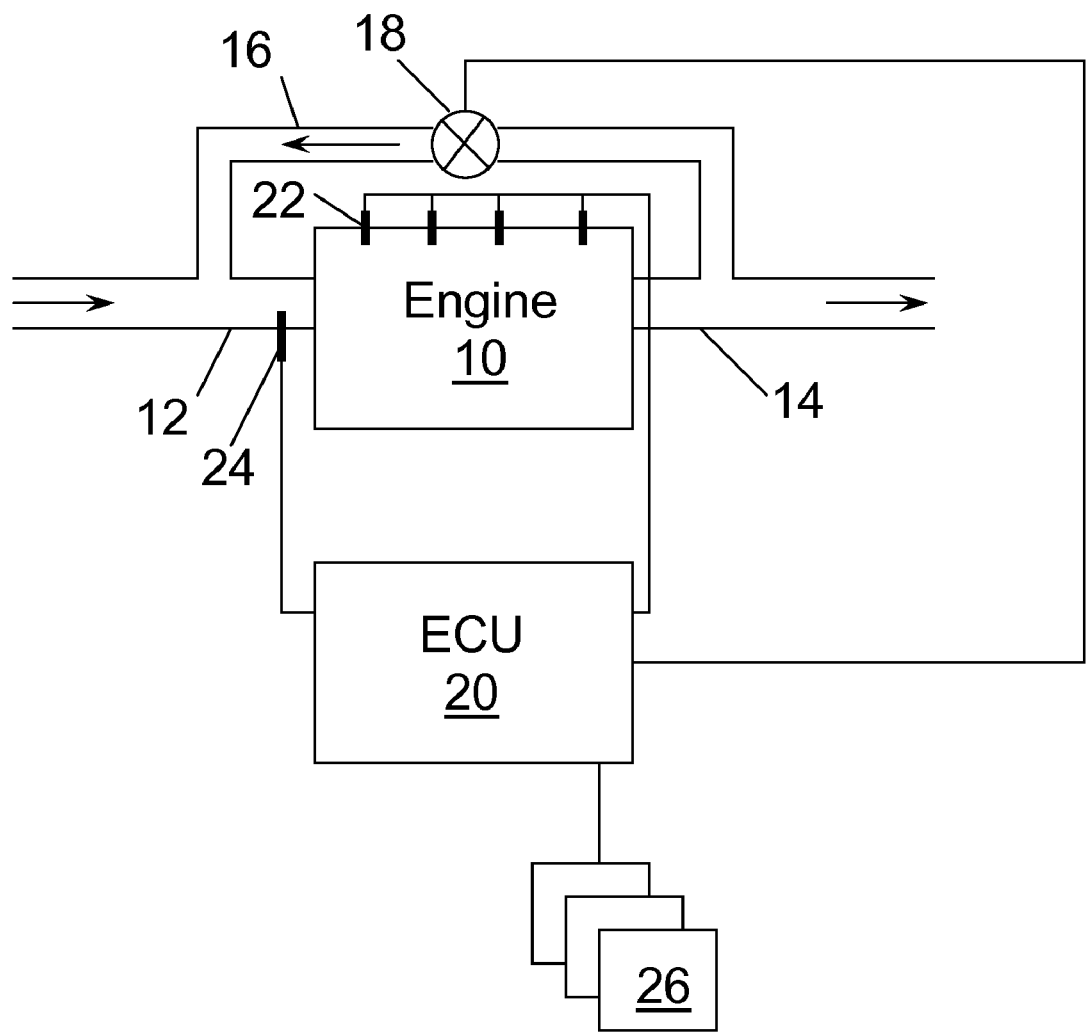
FIG. 1 is a schematic of a diesel engine.

In FIG. 1, engine 10 has an intake 12 and an exhaust 14. A portion of the exhaust flow can be directed in to the intake through an exhaust gas recirculation (EGR) duct 16 that has a valve 18 to control the EGR flow rate into the engine intake 12. An electronic control unit (ECU) 20 commands EGR valve 18 as well as fuel injectors 22. ECU 20 commands opening time and duration for one or more injection pulses per engine cycle. By adjusting the opening time, the amount of fuel that is injected is affected. The timing of the fuel injection event affects the time at which the fuel, in a compression engine ignition or diesel engine, ignites. Typically, in low temperature combustion (LTC), a single injection event (main injection) is used. However, in standard diesel combustion, it is common to use at least one pilot injection, which occurs well before the timing of the main injection. Pilot injection is known to reduce combustion noise as well as affect emissions and ignition timing.

In some control strategies, LTC is used at a particular set of operating conditions with standard diesel combustion used at another set of operating conditions. LTC, for example, is not suitable for providing high torque. Thus, when an engine operating in a LTC mode is commanded to produce a higher torque than possible for LTC, a transition is made to standard diesel combustion. LTC uses a much higher level of EGR than standard diesel combustion. Such a transition in EGR is difficult to occur exactly as desired. Thus, there are situations in which the combusted gas quantity in the intake gas deviates from that desired. To avoid undesirable combustion consequences due to the intake gas composition deviating from that desired, the intake gas composition is measured or estimated and adjustments are made based on the actual intake gas composition. The amount of combusted gas in the intake gases can be based on a signal from an oxygen sensor 24. Otherwise, the amount of combusted gases in the intake (FMAN) can be estimated based on other engine parameters such as: fuel supply rate, mass air flow, engine speed, oxygen concentration in the exhaust, and pressure and temperature in the intake. Such sensors are shown as other sensors 26 in FIG. 1.

Figure 2:
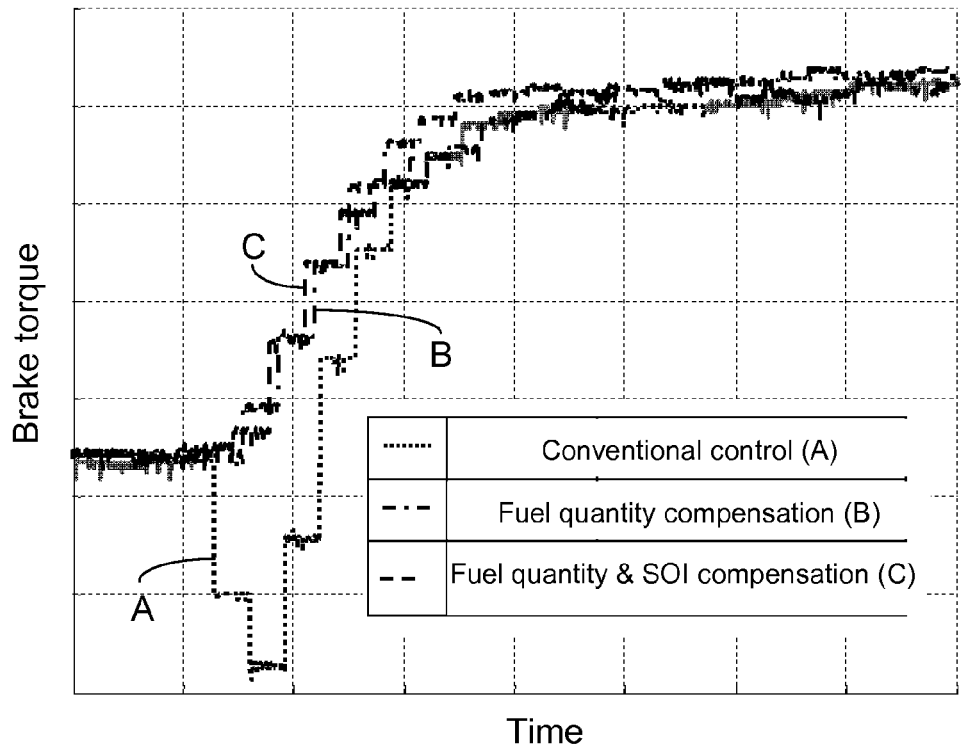
FIG. 2 is a plot of brake torque during a transition from LTC to standard diesel combustion for conventional control and two cases with compensation.

In FIG. 2, brake torque as a function of time for a transition from a LTC mode to a standard diesel combustion mode is shown for three cases: conventional control with no compensation (A), fuel quantity compensation (B), and fuel quantity and start of injection (SOI) compensation (C). (SOI is alternatively called injection timing herein.) During the transition, the torque drops off precipitously for case A with no compensation. LTC uses a higher EGR rate than standard diesel combustion can handle. It is difficult to control the EGR rate to provide the desired FMAN during the transition. Thus, with no compensation, FMAN is too high during the transition and combustion becomes unstable causing a substantial drop in brake torque. Once the transition from LTC to standard diesel combustion is nearly complete, brake torque for conventional control recovers and continues without further difficulty. Case B shows control in which the fuel quantity is adjusted during the transition. The fuel quantity is adjusted based on a difference between actual FMAN and desired FMAN. Brake torque smoothly increases to provide the desired transition for curve B. Similarly, for curve C, in which both the start of injection timing and the fuel quantity are adjusted, the transition yields a smooth increase in brake torque.

Figure 3:
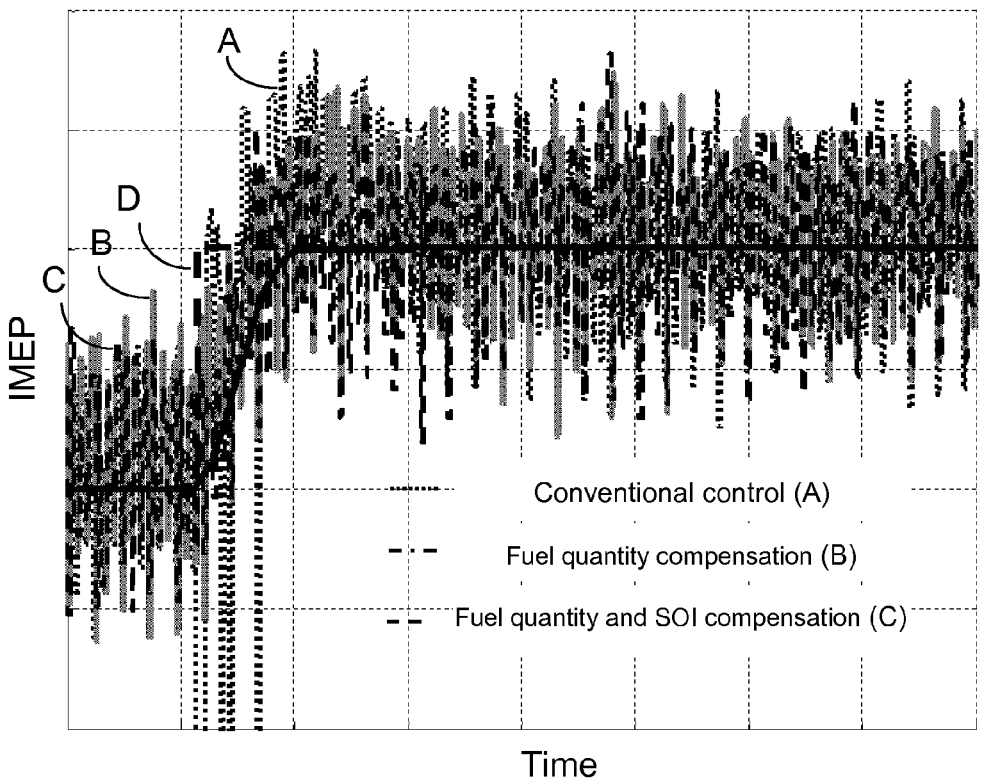
FIG. 3 is a plot of IMEP during a transition from LTC to standard diesel combustion for conventional engine control and two cases with compensation.

In FIG. 3, indicated mean effective pressure (IMEP) is plotted for individual cycles for three cases. Again, case A shows a problem in having low IMEP early in the transition. In FIG. 3, the thick dashed line is a desired, step-function change in IMEP. What can actually be achieved is shown as thick line D, which is an average of IMEPs for case C.

FIGS. 2 and 3 show that a significant dropout of brake torque and IMEP occurs during a transition from LTC to standard diesel combustion. Such dropout is very noticeable to an operator of the vehicle such that the operator senses that the vehicle is stalling. The performance through a transition is greatly improved when the adjustment per embodiments of the disclosure are employed.

Figure 4:
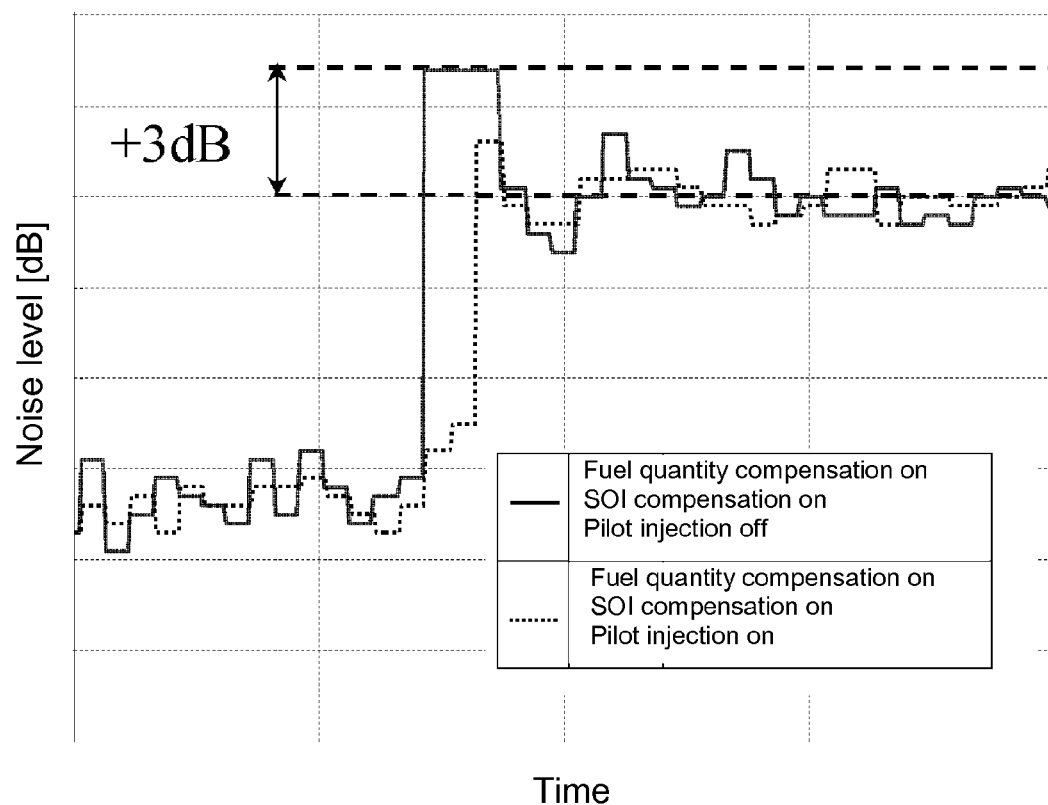
FIG. 4 is a plot of combustion noise during a transition from LTC to standard diesel combustion with and without pilot injection.

In FIG. 4, noise level is shown for a transition from LTC to standard diesel combustion to LTC. The solid line shows a case in which the transition is performed adjusting fuel quantity and SOI. The dotted line is a case in which a pilot injection is additionally provided. Without using pilot injection, the noise level peaks at about 3 dB higher during the transition as compared to the steady state level for LTC after the transition.

While the best mode has been described in detail, those familiar with the art will recognize various alternative designs and embodiments within the scope of the following claims. Where one or more embodiments have been described as providing advantages or being preferred over other embodiments and/or over background art in regard to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. For example, it may be desirable to have an extensive set of sensors to provide an accurate assessment of the state of vehicle accessories. However, to maintain a desirable cost structure, a satisfactory estimation of some accessory quantities may be ascertained by inferring from a lesser set of sensor data. The embodiments described as being less desirable relative to other embodiments with respect to one or more characteristics are not outside the scope of the disclosure as claimed.

What is claimed:

1. A system to control an engine to increase operation in a low temperature combustion mode, comprising:
    an electronic control unit (ECU);
    an engine cylinder having a fuel injector; and
    an engine sensor coupled to the ECU wherein an actual intake gas composition is estimated based on a signal from the engine sensor and the ECU commands at least one of an adjustment in quantity of fuel and fuel injection timing when the actual intake gas composition differs from a desired intake gas composition.

2. The system of claim 1 wherein one engine sensor is an oxygen sensor coupled to an engine intake.

3. The system of claim 1 wherein the ECU determines whether to transition between a low temperature combustion mode and a standard diesel combustion mode and the at least one of an adjustment in quantity of fuel and fuel injection timing is commanded by the ECU during the transition.

4. The system of claim 3, further comprising: providing a pilot injection during the transition.

5. The system of claim 1, further comprising:
an exhaust gas recirculation (EGR) system having: an EGR duct coupling a engine intake with an engine exhaust and an EGR valve disposed in the EGR duct; and
an oxygen sensor coupled to the engine intake at a location downstream of where the EGR duct is coupled to the engine intake wherein the ECU estimates the actual intake gas composition based on the oxygen sensor coupled to the engine intake.

6. The system of claim 1 wherein the engine sensor comprises at least one of mass air flow into the engine, intake manifold absolute pressure, temperature of the intake gases downstream of the addition of EGR into the intake gases, engine rpm, and a signal from an oxygen sensor coupled to an engine exhaust.

7. A method to control an internal combustion engine for increasing operation in a low temperature combustion mode, comprising:
determining a desired proportion of combusted gas in an engine intake;
determining an actual proportion of combusted gas in the engine intake; and
determining an injection timing based at least on a difference between the desired and actual proportion of combusted gas in the engine intake.

8. The method of claim 7 wherein the control is performed during transitions between low temperature combustion and standard diesel combustion.

9. The method of claim 8, further comprising:
commanding the determined quantity of fuel to a fuel injector coupled to a cylinder of the engine; and
commanding the determined injection timing to the fuel injector.

10. The method of claim 8 wherein the quantity of fuel injected and the injection timing are further based on a present engine operating condition.

11. The method of claim 7, further comprising:
determining a quantity of fuel to inject into engine cylinders based at least on the difference between the desired and actual proportion of combusted gas in the engine intake.

12. The method of claim 7, further comprising:
providing at least one pilot injection based on the actual proportion of combusted gas in the engine intake.

13. The method of claim 7 wherein the actual proportion of combusted gas in the engine intake is based on a signal from an oxygen sensor coupled to the engine intake.

14. The method of claim 1 wherein the actual proportion of combusted gas in the engine intake is based on signals from engine sensors including at least one of: intake pressure, intake temperature, intake mass flow, engine speed, oxygen concentration in the exhaust, and engine speed.

15. A method to control an internal combustion engine to improve transitions between a standard combustion mode and a low temperature combustion mode, comprising:
determining a desired FMAN wherein FMAN is a proportion of combusted gas in the intake gases in an intake of the engine:
determining an actual FMAN; and
determining a quantity of fuel to be injected based at least on a difference between the desired FMAN and the actual FMAN.

16. The method of claim 15, further comprising:
determining an injection timing based at least on the difference between the desired FMAN and the actual FMAN.

17. The method of claim 16, further comprising:
commanding the determined quantity of fuel to a fuel injector coupled to a cylinder of the engine; and
commanding the determined injection timing to the fuel injector.

18. The method of claim 16 wherein the quantity of fuel to be injected and the injection timing are further based on a present engine operating condition.

19. The method of claim 15 wherein the control is performed in response to a determination that a transition is occurring between low temperature combustion and standard diesel combustion.

20. The method of claim 15 wherein the actual FMAN is based on a signal from an oxygen sensor disposed in an engine intake downstream of a location at which EGR gases are introduced into the engine intake.

* * * * *